（12）United States Patent
Mashimo et al.

(10) Patent No.: US 11,843,723 B2
(45) Date of Patent: Dec. 12, 2023

(54) IMAGE PROJECTION APPARATUS

(71) Applicants: Jun Mashimo, Kanagawa (JP); Kasumi Nakamura, Kanagawa (JP); Momotaro Yoshida, Kanagawa (JP)

(72) Inventors: Jun Mashimo, Kanagawa (JP); Kasumi Nakamura, Kanagawa (JP); Momotaro Yoshida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/974,558

(22) Filed: Oct. 27, 2022

(65) Prior Publication Data

US 2023/0209025 A1 Jun. 29, 2023

(51) Int. Cl.
H04N 9/31 (2006.01)

(52) U.S. Cl.
CPC ......... *H04N 9/3158* (2013.01); *H04N 9/3161* (2013.01); *H04N 9/3164* (2013.01)

(58) Field of Classification Search
CPC .. H04N 9/3164; H04N 9/3161; H04N 9/3158; H04N 9/3155; H04N 9/31; G03B 21/204; G03B 21/2033; G03B 21/2013; G03B 21/2066
USPC ............... 348/744, 760, 778, 779, 781, 782; 353/30, 31
See application file for complete search history.

(56) References Cited

U.S. PATENT DOCUMENTS

| | | | |
|---|---|---|---|
| 11,647,171 B2 * | 5/2023 | Fan | G03B 21/204 353/34 |
| 2016/0062219 A1 | 3/2016 | Mikawa et al. | |
| 2016/0154294 A1 | 6/2016 | Fujioka et al. | |
| 2016/0198134 A1 | 7/2016 | Mikawa et al. | |
| 2016/0274444 A1 | 9/2016 | Mikutsu et al. | |
| 2016/0277716 A1 | 9/2016 | Mikawa et al. | |
| 2016/0377963 A1 | 12/2016 | Tsuchiya et al. | |
| 2017/0026623 A1 | 1/2017 | Nishi et al. | |
| 2017/0031127 A1 | 2/2017 | Tsuchiya et al. | |
| 2017/0031132 A1 | 2/2017 | Fujioka et al. | |
| 2017/0068150 A1 | 3/2017 | Nishimori et al. | |
| 2017/0068151 A1 | 3/2017 | Mikawa et al. | |
| 2017/0068152 A1 | 3/2017 | Mikawa et al. | |

(Continued)

FOREIGN PATENT DOCUMENTS

| | | |
|---|---|---|
| JP | 2011-145681 | 7/2011 |
| JP | 2012-141411 | 7/2012 |

*Primary Examiner* — Sherrie Hsia
(74) *Attorney, Agent, or Firm* — XSENSUS LLP

(57) ABSTRACT

An image projection apparatus includes a first light source to emit a first excitation light of a specific wavelength, a second light source to emit a second excitation light of a specific wavelength, a first planar wavelength conversion element to convert the first excitation light into a light of a different specific wavelength, and a second planar wavelength conversion element to convert the second excitation light into a light of a specific wavelength different from the specific wavelength of the first excitation light converted by the first planar wavelength conversion element. In the image projection apparatus, the first planar wavelength conversion element and the second planar wavelength conversion element are arranged at positions different from each other, and the first planar wavelength conversion element and the second planar wavelength conversion element have a first plane and a second plane.

4 Claims, 5 Drawing Sheets

(56) References Cited

U.S. PATENT DOCUMENTS

| | | |
|---|---|---|
| 2017/0244940 A1 | 8/2017 | Mikawa et al. |
| 2018/0059521 A1 | 3/2018 | Nishimori et al. |
| 2018/0120678 A1 | 5/2018 | Mikutsu et al. |
| 2018/0143516 A1 | 5/2018 | Nishimori et al. |
| 2019/0391385 A1 | 12/2019 | Mashiro |
| 2020/0371342 A1 | 11/2020 | Mashimo |
| 2021/0250563 A1 | 8/2021 | Mashimo |

* cited by examiner

IMAGE PROJECTION APPARATUS

CROSS-REFERENCE TO RELATED APPLICATION

This patent application is based on and claims priority pursuant to 35 U.S.C. § 119(a) to Japanese Patent Application No. 2021-211190, filed on Dec. 24, 2021, in the Japan Patent Office, the entire disclosure of which is hereby incorporated by reference herein.

BACKGROUND

Technical Field

Embodiments of the present disclosure relate to an image projection apparatus.

Background Art

Some technologies have been proposed to emit the light of three colors using a plurality of laser-diode (LD) light sources and phosphors in the light-source devices that adopts such LD light sources. In such light-source devices that emit the light of three colors, the light transformation efficiency of the phosphors is low when transmissive phosphors are used. As a result, the output power of a projector tends to be low. In order to avoid such a situation, typically, the light-source devices that emit the light of three colors use reflective phosphors.

For the purposes of optimizing the luminous efficiency of the phosphors, some technologies have been proposed to make the optical paths of the fluorescent lights emitted from the pair of phosphors equivalent to each other. For the purposes of maintaining the color balance between the red light and the blue light regardless of the variations in the brightness of the excitation light emitted from the excitation light sources and the variations in brightness caused by the life of the excitation light sources, some technologies have been proposed to make the optical paths in which the fluorescent lights emitted from the pair of phosphors equivalent to each other.

SUMMARY

Embodiments of the present disclosure described herein provide an image projection apparatus including a first light source to emit a first excitation light of a specific wavelength, a second light source to emit a second excitation light of a specific wavelength, a first planar wavelength conversion element to convert the first excitation light into a light of a different specific wavelength, and a second planar wavelength conversion element to convert the second excitation light into a light of a specific wavelength different from the specific wavelength of the first excitation light converted by the first planar wavelength conversion element. In the image projection apparatus, the first planar wavelength conversion element and the second planar wavelength conversion element are arranged at positions different from each other, and the first planar wavelength conversion element and the second planar wavelength conversion element have a first plane and a second plane, respectively, and the first plane of the first planar wavelength conversion element is orthogonal to the second plane of the second planar wavelength conversion element. In the image projection apparatus, the light converted by the first planar wavelength conversion element has a first optical-path length equivalent to a second optical-path length of the light converted by the second planar wavelength conversion element, and at least one of a first optical axis of the first excitation light or a second optical axis of the second excitation light is not on a plane formed by an optical axis of the light converted by the first planar wavelength conversion element and an optical axis of the light converted by the second planar wavelength conversion element.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

Figure 1:
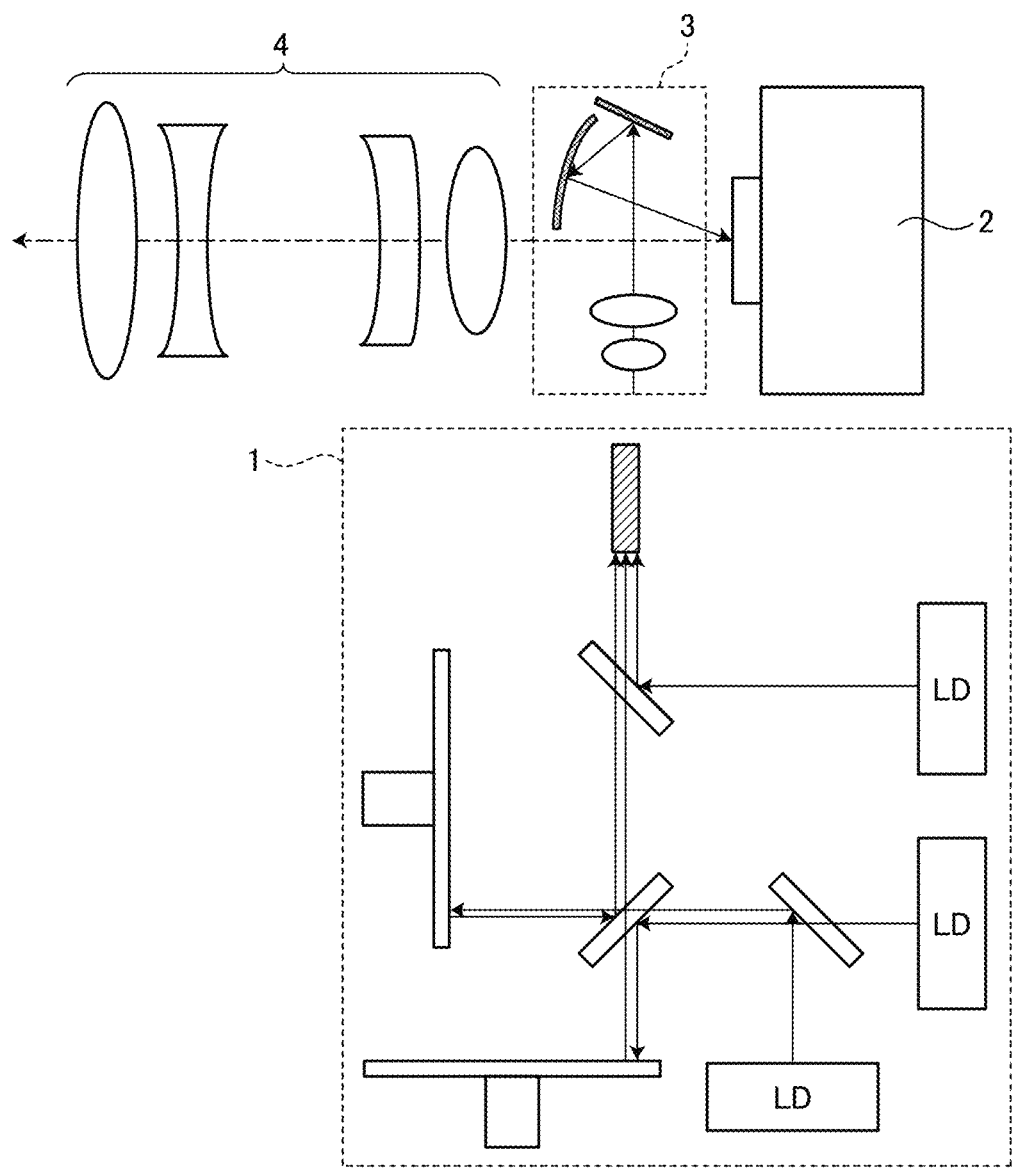
FIG. 1 is a diagram illustrating a configuration of an image projection apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

An image projection apparatus according to an embodiment of the present disclosure is described below in detail with reference to the accompanying drawings.

FIG. 1 is a diagram illustrating a configuration of an image projection apparatus according to an embodiment of the present disclosure.

As illustrated in FIG. 1, the image projection apparatus according to the present embodiment includes, for example, a light-source device 1, an image display element 2, an illumination optical system 3, and a projection optical system 4.

The image display element 2 according to the present embodiment serves as an image display element that forms an image. The illumination optical system 3 according to the present embodiment is an illumination optical system that guides the light emitted from the light-source device 1 to the image display element 2. The projection optical system 4 according to the present embodiment is a projection optical system that magnifies the image formed on the image display element 2 and projects the magnified image onto a display device such as a screen.

Figure 2:
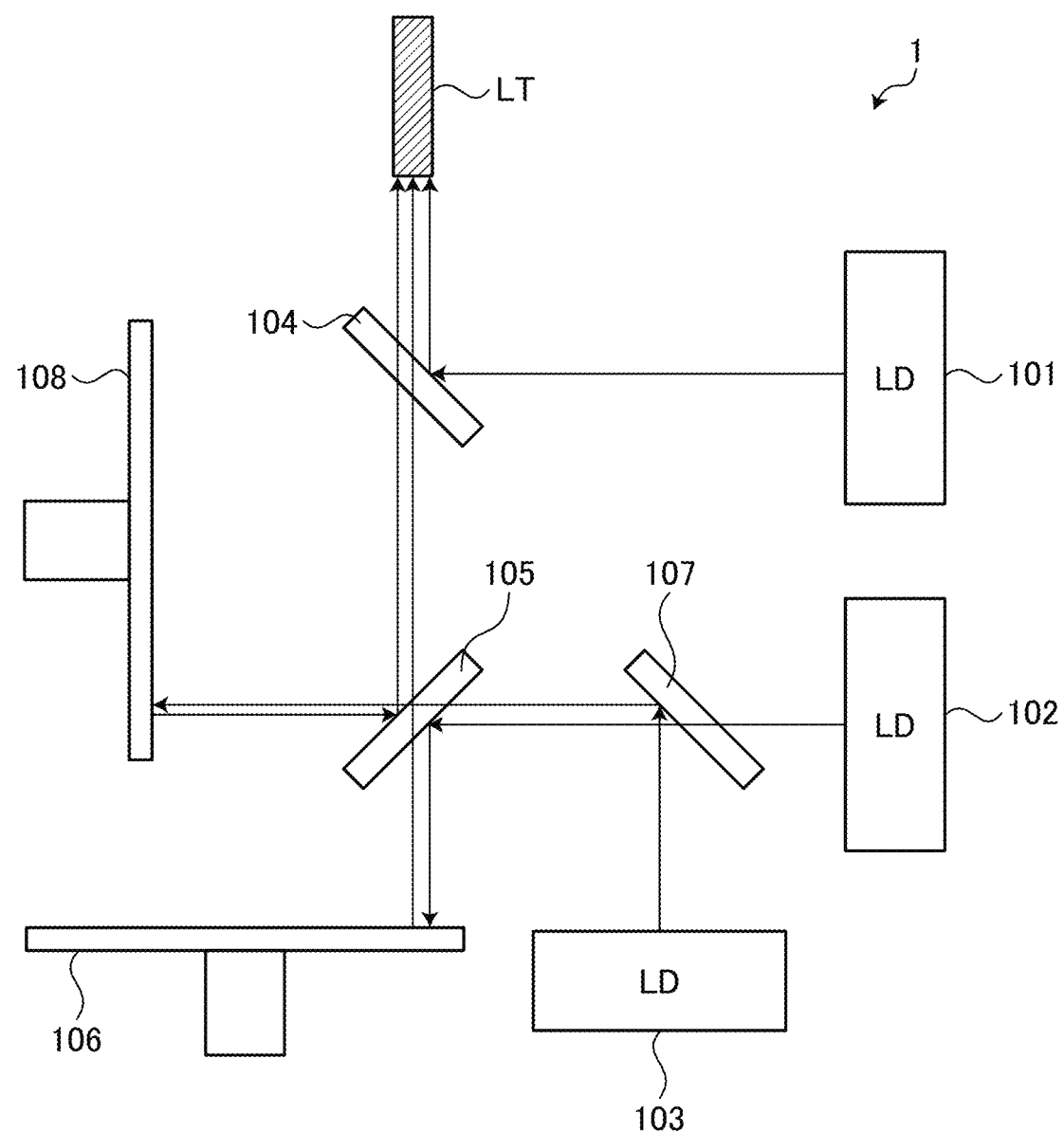
FIG. 2 is a diagram illustrating a configuration of a light-source device provided for an image projection apparatus, according to an embodiment of the present disclosure.

FIG. 2 is a diagram illustrating a configuration of the light-source device 1 provided for an image projection apparatus, according to an embodiment of the present disclosure.

The light-source device 1 according to the present embodiment is a light-source device that emits the light of three colors, and is a downsized light-source device in which a pair of reflective phosphors with high light transformation efficiency are used to make the optical-path lengths of the light emitted from the pair of phosphors approximately equivalent to each other.

More specifically, as illustrated in FIG. 1, the light-source device 1 according to the present embodiment is a light-source device provided with three laser beam sources including a first laser beam source 101, a second laser beam source 102, and a third laser beam source 103. The first laser beam source 101 emits blue excitation light, and the blue excitation light is reflected by the dichroic mirror 104. As a result, the blue excitation light is guided to a light tunnel LT on an as-is basis.

The second laser beam source 102 that serves as a first light source emits blue excitation light, and the blue excitation light is reflected by the dichroic mirror 105. As a result, the phosphor 106 of red color is irradiated with the blue excitation light. The blue excitation light serves as the first excitation light of a specific wavelength. The phosphor 106 of red color is a planar wavelength conversion element that converts the light into a red light whose wavelength is different from that of the excitation light of blue color. Such a red light serves as a light of a predetermined wavelength, and the phosphor 106 according to the present embodiment serves as the first wavelength conversion element. The red light is guided to the light tunnel LT.

The third laser beam source 103 that serves as a second light source emits blue excitation light, and the blue excitation light is reflected by the dichroic mirror 107. The blue excitation light serves as the second excitation light of a specific wavelength. As a result, the phosphor 108 of green color is irradiated with the blue excitation light. The phosphor 108 of green color is a planar wavelength conversion element that converts the light into a green light whose wavelength is different from that of the excitation light converted by the phosphor 106. Such a red light serves as a light of a predetermined wavelength, and the phosphor 108 according to the present embodiment serves as the second wavelength conversion element. The green light is reflected by the dichroic mirror 105, and is guided to the light tunnel LT.

In the light-source device 1 of the above configuration or structure, the optical-path lengths of the fluorescent light to the light tunnel LT are equivalent to each other between the fluorescent light converted by the phosphor 106 and the fluorescent light converted by the phosphor 108. In other words, the optical-path length of the red light emitted from the phosphor 106 is equivalent to the optical-path length of the green light emitted from the phosphor 108. Moreover, the phosphor 106 and the phosphor 108 are arranged at positions different from each other, and the plane of the phosphor 106 and the plane of the phosphor 108 are orthogonal to each other. In the dichroic mirror 105 according to the present embodiment, the wavelength range of transmission and reflection may be different between the upper and lower portions. For example, the dichroic mirror 105 according to the present embodiment may have different wavelength ranges so as to have a red reflective coating and a blue reflective coating in the upper portion and to have the blue reflective coating only in the lower portion. The upper portion of the dichroic mirror 105 transmits the excitation light emitted from the third laser beam source 103 that serves as the second light source. Then, the phosphor 108 converts the excitation light into fluorescent light of green color, and the upper portion of the dichroic mirror 105 reflects the fluorescent light of green color. By contrast, the lower portion of the dichroic mirror 105 reflects the excitation light emitted from the second laser beam source 102 that serves as the first light source. Then, the phosphor 106 converts the excitation light into fluorescent light of red color, and the lower portion of the dichroic mirror 105 transmits the fluorescent light of red color. Due to such configurations as described above, the light-source device 1 according to the present embodiment can guide the color of three colors to the illumination optical system 3. The dichroic mirror 107 has no mirror on an optical path through which the light passes.

Figure 3:
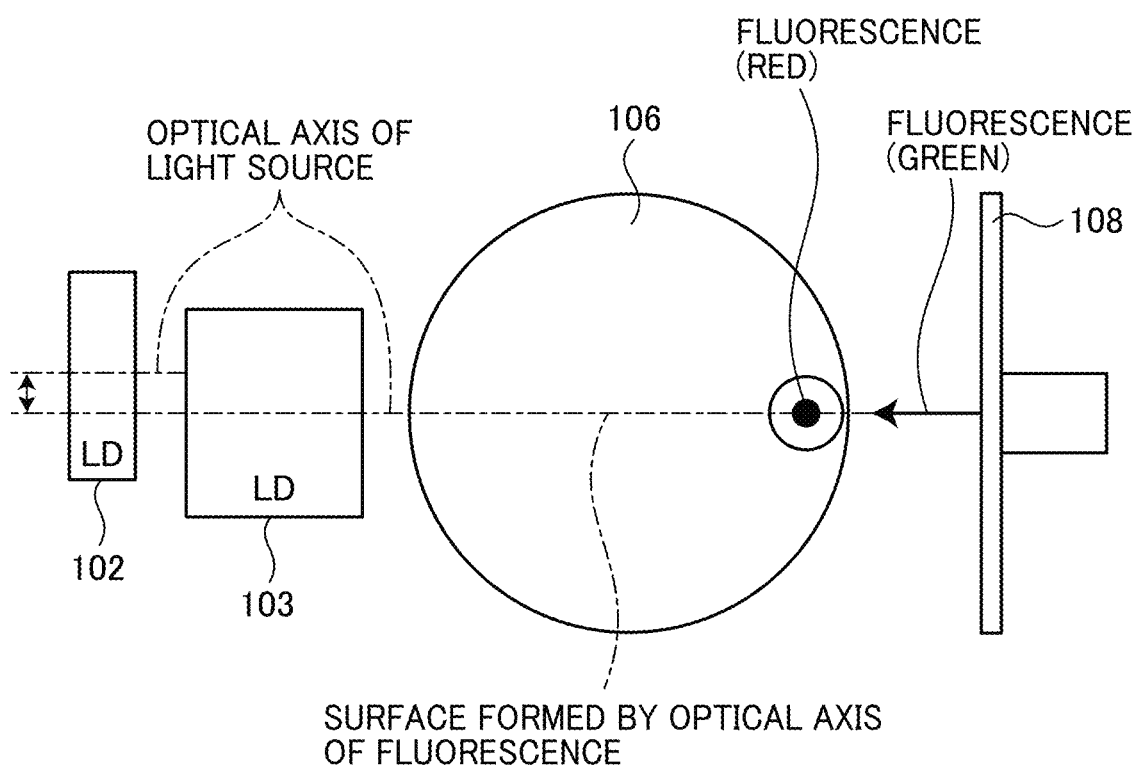
FIG. 3 is a diagram illustrating an example configuration of a light-source device provided for an image projection apparatus, according to an embodiment of the present disclosure.

FIG. 3 is a diagram illustrating an example configuration of the light-source device 1 provided for the image projection apparatus, according to the present embodiment.

As illustrated in FIG. 3, in the three-dimensional structure or configuration for downsizing the light-source device 1, the optical axis of the excitation light emitted from at least one of the second laser beam source 102 and the third laser beam source 103, for example, the second laser beam source 102, are not arranged on the same plane as the plane formed by the optical axes of the pair of fluorescent lights of red and green colors emitted or reflected from the pair of phosphors 106 and 108. Due to the adoption of such a configuration as described above, compared with the structure or configuration in which the optical axis of the excitation light emitted from the second laser beam source 102 is arranged on the plane that is formed by the optical axes of the pair of fluorescent lights emitted from the pair of phosphors 106 and 108, the number of the dichroic mirrors that guide the fluorescent light to an illumination system can be made one. Accordingly, the number of the elements of an optical component can be reduced. As a result, the light-source device 1 that can emit the light of three colors is achieved with a reduced size, high output power, and no blurring or mottling. In the arrangement described above, the displacement in the positions of the second laser beam source 102 and the third laser beam source 103 is adjusted or corrected by at least one optical element that guides the light to the phosphor 106 or the phosphor 108.

As described above, with the image projection apparatus according to the present embodiment, the optical axis of the excitation light emitted from at least one of the second laser beam source 102 and the third laser beam source 103 are not arranged on the same plane as the plane formed by the optical axes of the pair of fluorescent lights emitted or reflected from the pair of phosphors 106 and 108. Due to the adoption of such a configuration as described above, compared with the structure or configuration in which the optical axis of the excitation light emitted from the second laser beam source 102 is arranged on the plane that is formed by the optical axes of the pair of fluorescent lights emitted from the pair of phosphors 106 and 108, the number of the dichroic mirrors that guide the fluorescent light to an illumination system can be made one. Accordingly, the number of the elements of an optical component can be reduced. As a result, the light-source device 1 that can emit the light of three colors is achieved with a reduced size, high output power, and no blurring or mottling.

First Example

In the first example of the present disclosure, the second wavelength conversion element and the rotation axis of the first rotor that is provided with the first wavelength conversion element are arranged in the same space with reference to the point on which the excitation light is incident. By contrast, in the first example of the present disclosure, the rotation axis of the second rotor provided with the second wavelength conversion element is arranged in the space opposite the space in which the light source of the excitation light is arranged, with reference to the point on which the excitation light is incident.

Figure 4:
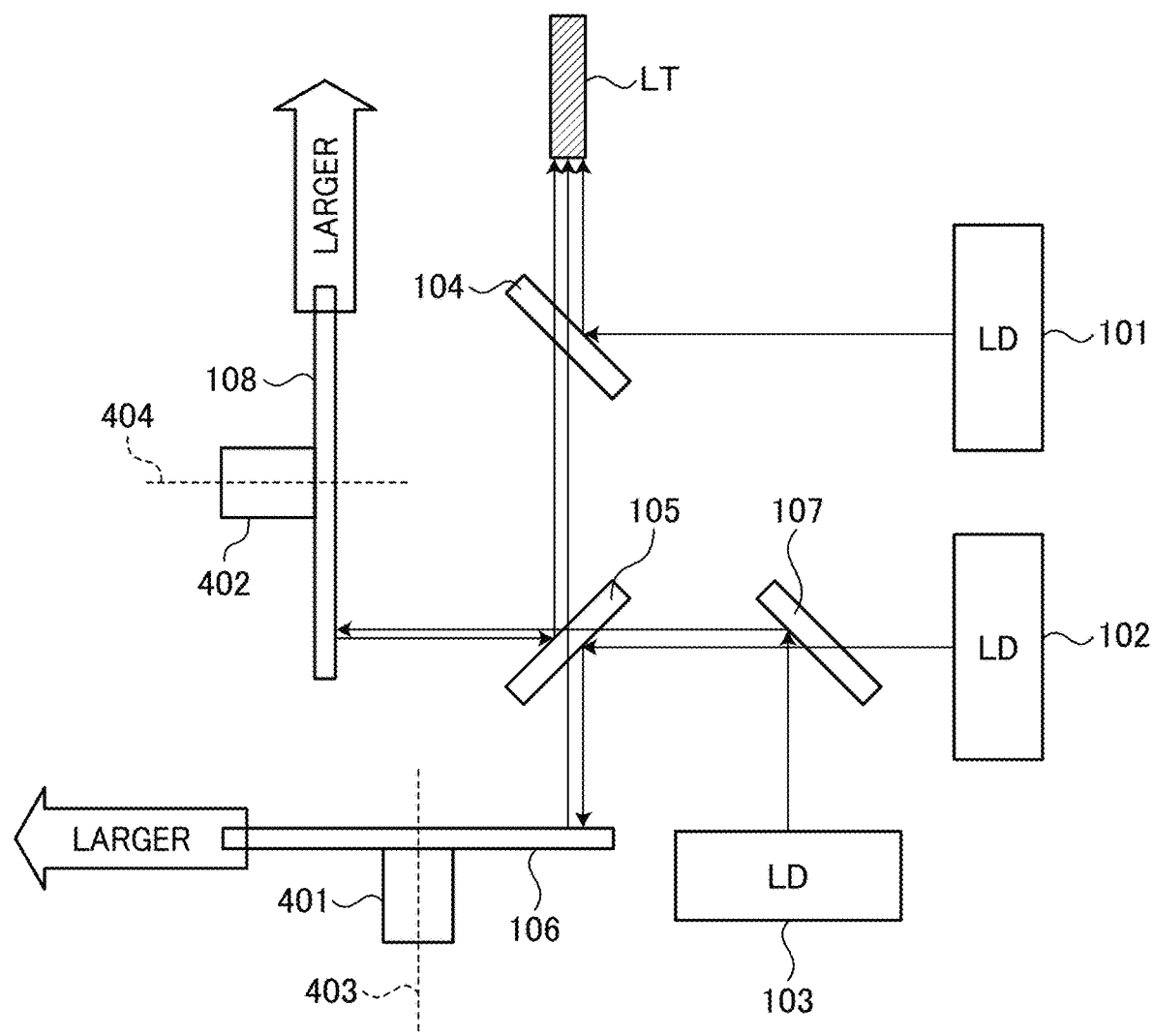
FIG. 4 is a diagram illustrating a configuration of a light-source device according to a first example of the present disclosure.

FIG. 4 is a diagram illustrating a configuration of the light-source device 1 according to the first example of the present disclosure.

In the present example, the phosphor 106 is a layer of phosphor arranged over the rotor 401 that serves as the first rotor. In a similar manner, in the present example, the phosphor 108 is a layer of phosphor arranged over the rotor 402 that serves as the second rotor.

In the first example of the present disclosure, the phosphor 108 and the rotation axis 403 of the rotor 401 on which the phosphor 106 is arranged are arranged in the same space with reference to the point on which the blue excitation light emitted from the second laser beam source 102 is incident. By contrast, in the first example of the present disclosure, the rotation axis 404 of the rotor 402 on which the phosphor 108 is arranged is arranged in the space opposite the space in which the third laser beam source 103 emitting the blue excitation light is arranged, with reference to the point on which the blue excitation light emitted from the third laser beam source 103 is incident. Due to the adoption of such a configuration as described above, even when the output power of the light-source device 1 increases and the phosphor 106 and the phosphor 108 increase in size, the upsizing of the phosphor 106 and the phosphor 108 does not significantly affect the size of the entire apparatus, and the upsizing of the light-source device 1 can be prevented.

Second Example

In the second example of the present disclosure, the plane that is formed by the axis of the first rotor provided with the first wavelength conversion element and the axis of the second rotor provided with the second wavelength conversion element is parallel to the plane that is formed by the optical axis of the light emitted from the first wavelength conversion element and the optical axis of the light emitted from the second wavelength conversion element.

Figure 5:
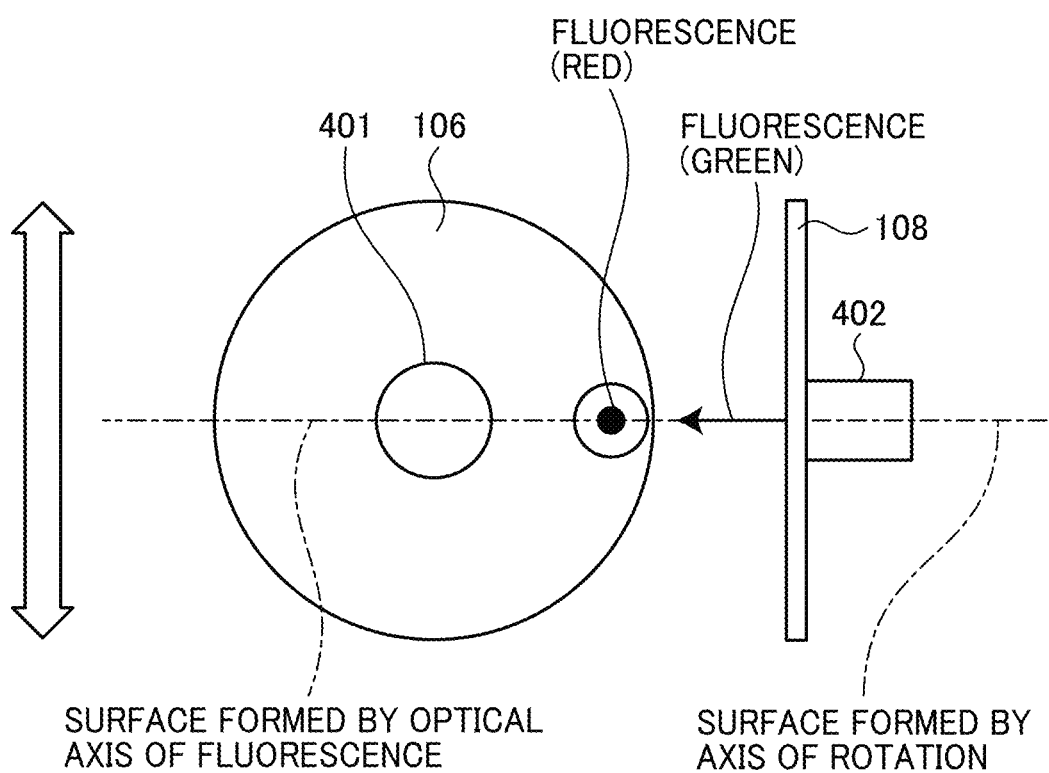
FIG. 5 is a diagram illustrating a configuration of a light-source device according to a second example of the present disclosure.

FIG. 5 is a diagram illustrating a configuration of the light-source device 1 according to the second example of the present disclosure.

In the second example of the present disclosure, when the phosphor 106 is arranged on the rotor 401 and the phosphor 108 is arranged on the rotor 402, As illustrated in FIG. 5, the plane that is formed by the rotation axis 403 of the rotor 401 and the rotation axis 404 of the rotor 402 is parallel to the plane that is formed by the optical axis of the fluorescent light emitted from the phosphor 106 and the optical axis of the fluorescent light emitted from the phosphor 108. Due to the adoption of such a configuration as described above, the wheel height of the rotor 401 on which the phosphor 106 is formed matches the wheel height of the rotor 402 on which the phosphor 108 is formed, and the height of the light-source device 1 is not increased in an unwanted manner.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field-programmable gate array (FPGA), and conventional circuit components arranged to perform the recited functions.

What is claimed is:

1. An image projection apparatus comprising:
   a first light source configured to emit a first excitation light of a specific wavelength;
   a second light source configured to emit a second excitation light of a specific wavelength;
   a first planar wavelength conversion element configured to convert the first excitation light into a light of a different specific wavelength; and
   a second planar wavelength conversion element configured to convert the second excitation light into a light of a specific wavelength different from the specific wavelength of the first excitation light converted by the first planar wavelength conversion element,
   wherein the first planar wavelength conversion element and the second planar wavelength conversion element are arranged at positions different from each other,
   wherein the first planar wavelength conversion element and the second planar wavelength conversion element have a first plane and a second plane, respectively, and the first plane of the first planar wavelength conversion element is orthogonal to the second plane of the second planar wavelength conversion element,
   wherein the light converted by the first planar wavelength conversion element has a first optical-path length equivalent to a second optical-path length of the light converted by the second planar wavelength conversion element, and
   wherein at least one of a first optical axis of the first excitation light or a second optical axis of the second excitation light is not on a plane formed by an optical axis of the light converted by the first planar wavelength conversion element and an optical axis of the light converted by the second planar wavelength conversion element.

2. The image projection apparatus according to claim 1, wherein the first planar wavelength conversion element is a layer of phosphor disposed on a first rotor,
   wherein the second planar wavelength conversion element is a layer of phosphor disposed on a second rotor,
   wherein an axis of the first rotor and the second planar wavelength conversion element are disposed in same space with reference to a point on which the first excitation light is incident, and wherein an axis of the second rotor is disposed in space opposite to space in which the second light source is disposed, with reference to a point on which the second excitation light is incident.

3. The image projection apparatus according to claim 1, further comprising:
an image display element configured to form an image;
an illumination optical system configured to guide the first excitation light and the second excitation light to the image display element; and
a projection optical system configured to magnify an image formed by the image display element.

4. The image projection apparatus according to claim 1,
wherein the first planar wavelength conversion element is a layer of phosphor disposed on a first rotor,
wherein the second planar wavelength conversion element is a layer of phosphor disposed on a second rotor, and
wherein a plane formed by an axis of the first rotor and an axis of the second rotor is parallel to a plane formed by an optical axis of the light converted by the first planar wavelength conversion element and an optical axis of the light converted by the second planar wavelength conversion element.

* * * * *